Patented Jan. 8, 1952

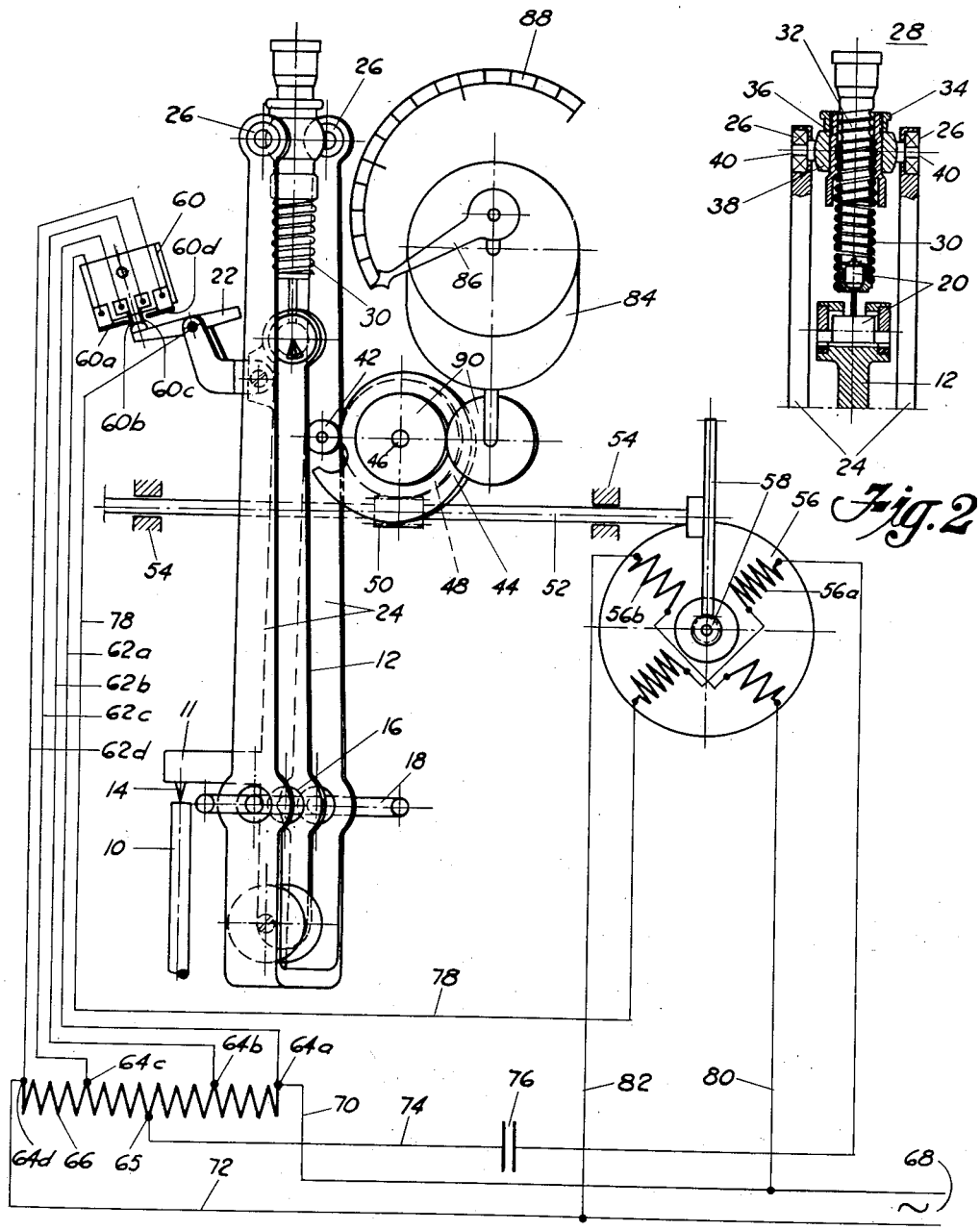

2,581,811

UNITED STATES PATENT OFFICE 2,581,811

BALANCING MECHANISM FOR PRESSURE LOGS

Edvin Mauritz Österman, Stockholm, Sweden, assignor to Svenska Ackumulator Aktiebolaget Jungner, Stockholm, Sweden, a corporation of Sweden Application March 21, 1949, Serial No. 82,518
In Sweden April 10, 1948

2 Claims. (Cl. 318—32)

In pressure logs, in which the pressure of speed is balanced by aid of a spring device, the balance mechanism usually comprises a lever which is actuated by a moment deriving from the pressure of speed. The spring delivering said moment has been arranged so that its one end actuates the balancing beam whereas its other end has been rotatably secured to a transferring arm. The position of this arm is determined by the position of a cam which is adjusted by an auxiliary motor. The latter is in turn controlled by a contact device which is actuated by the turn of the balancing beam. The transferring arm has been constructed as a double-armed lever and journalled at a point near the end of the balancing beam, which carries the attachment of the balancing spring. This arrangement is considerably simplified by the present invention which substantially involves that the transferring arm is constructed as a single-armed lever. Suitably the transferring lever is journalled concentrically with the balancing beam. This brings the advantage that the elements become simpler in manufacture and that the requirement for space is materially reduced without giving up the accuracy.

An embodiment of the invention is illustrated in the accompanying drawing in which Fig. 1 is a diagrammatical view of the arrangement, partly in perspective, and Fig. 2 is a longitudinal partial section through the balancing spring.

In the drawing 10 designates a pressure rod which transfers the force deriving from the pressure of speed. This force is approximately proportional to the square of the speed of the vessel. The pressure rod engages a projection 11 on a balancing beam 12 by edge means 14, the beam being journalled by an antifriction bearing such as a ball bearing 16 on a shaft or stem 18. The balancing beam carries a rotatably journalled spring attachment 20 and a slip contact lever 22. Journalled on the shaft 18 is also a transferring arm or lever 24 which is U-shaped and has its shanks located at opposite sides of beam 12. At its end the lever 24 carries ball bearings 26, 26 which in turn carry an attachment 28 for spring means such as one end of a helical spring 30, the other end of which is connected with the spring attachment 20. The force from the spring 30 can be controlled by a screw 32 engaging the inner side of the spring 30 and a nut 34 engaging a screw-threaded sleeve 36 which in turn engages the spring at the outer side thereof. The screw 32 substantially being adapted to change the number of free turns of the helical spring 30 whereby the spring coefficient of the latter is changed. The nut 34 and sleeve 36 are adapted to change the tension of the spring 30, by rotation of nut 34 relative to sleeve 36 and axial displacement of the latter as a result of such rotation. The attachment 28 further comprises a ring 38 surrounding the sleeve 36 and engaged by the end surface of the nut 34, said ring having opposite studs 40, 40 carried into the bearings 26, 26. The arm or lever 24 comprises a roller 42 mounted at one shank thereof and suitably formed as a ball bearing. A cam 44 keyed to a rotatable shaft 46 actuates or engages the roller 42 and it is to be noted that the point at which the arm 24 is thus actuated is located at the same side of the axis of shaft 18 as the place of the arm 24 where the spring 30 actuates said arm by way of the spring attachment so that the arm 24 will act as a single-armed lever, the pivot of which is formed by the shaft 18.

Mounted on the shaft 46 of the cam 44 is a worm gear 48 which meshes with a worm screw 50 keyed to a rotary shaft 52 which is carried by bearings 54, 54. The shaft 52 is driven by an electric motor 56 by way of a gear transmission 58. A contact device 60 operated by the contact lever 22 on the balancing beam 12 is coupled by a phase changing coupling arrangement to the motor, which is shown as a phase split motor having two windings 56a, 56b. The contact device 60 may have two or more pair of contacts mounted symmetrically and is shown with four contacts 60a, 60b, 60c, 60d connected by leads 62a, 62b, 62c and 62d, respectively, to points 64a, 64b, 64c and 64d, respectively, arranged symmetrically relatively to a central point 65 of a resistance 66, the ends of which are connected to a source of alternating current 68 by leads 70, 72. The central point 65 is connected to one terminal of the winding 56a by a lead 74 including a condenser 76, the other terminal being connected by a lead 78 to the contact lever 22. The terminals of the winding 56b are connected to the leads 70, 72 by leads 80 and 82, respectively. The operation of the coupling arrangement would be self-explanatory, and it would be sufficient to state that the motor does not move, when the contact lever 22 engages the two central contacts 60b, 60c, rotates in one direction if the lever 22 is displaced to one side from its central position and rotates in the opposite direction if the lever is displaced to the other side from the central position. The direction of rotation is chosen so that if the turning moment actuating the balancing beam 12 and deriving from the pressure of speed is greater than the turning moment on the balancing lever deriving from the spring 30, the moment in both cases being taken with respect to the axis of shaft 18, the transferring lever 24 turns counterclockwise in the drawing about the shaft 18, whereby the moment from spring 30 is increased. The moment is approximately proportional to the square of the angular change of the lever 24 from the zero position. The peripheral contour of the cam 44 is approximately an Archimedian spiral.

The cam 44 is connected with a transmission device 84, for example, an electric transmission device and a pointer 86 cooperating with a scale 88, the connection being obtained by a gear transmission 90. The turning movement of the pointer 86 may be transmitted by the transmission device 84 to any desired number of points in the vessel, in which the log is mounted. The rotary movement of the cam 44 as well as that of the worm screw 50 and the pointer 86 become proportionate to the speed, i. e. the scale of speed becomes rectilinear.

By the fact that the roller 42 is located on the transferring lever 24, this lever becomes single-armed and gets a simpler form than in the prior device. At the same time a great difference between the maximum radius and the minimum radius of the cam 44 can be obtained while utilizing only a relatively little space.

What I claim is:

1. A balancing mechanism for pressure logs, comprising a shaft, a balancing beam rotatable about the axis of said shaft, means to impart a turning moment proportional to the pressure of speed to be measured by the log to said balancing beam, a transferring arm mounted rotatably in coaxial relation to said shaft, spring means connected between the balancing beam and a place on the transferring arm, a rotatable cam, a motor for rotation of said cam, and a switch controlled by the balancing beam and controlling the motor, said cam being designed to strain the spring by actuating the transferring arm at a point located at the same end of the transferring arm as said place, whereby said arms acts as a single-armed lever.

2. A balancing mechanism for pressure logs comprising a pivot shaft, a balancing beam pivoted on said shaft, means to impart a tilting moment to said balancing beam proportional to the pressure of speed to be measured by the log, a transferring arm pivoted on said pivot shaft extending coincident with and beyond the end of said balancing beam, a spring connected between the end of the balancing beam and the end of the transferring arm, a rotatable cam engaging said transferring arm between said pivot shaft and the end connected to the spring, a motor for rotation of said cam and a switch controlling said motor actuated by motion of said balancing beam.

EDVIN MAURITZ ÖSTERMAN.

REFERENCES CITED

The following references are of record in the file of this patent:

UNITED STATES PATENTS

| Number | Name | Date |
| --- | --- | --- |
| 1,968,539 | Rydberg | July 31, 1934 |
| 2,107,976 | Blasig | Feb. 8, 1938 |
| 2,403,685 | Rosenberger | Oct. 1, 1946 |
| 2,409,435 | Ketay et al. | Oct. 15, 1946 |